J. G. JOHNSON.
COMPRESSOR.
APPLICATION FILED NOV. 23, 1920.
1,436,263.
Patented Nov. 21, 1922.
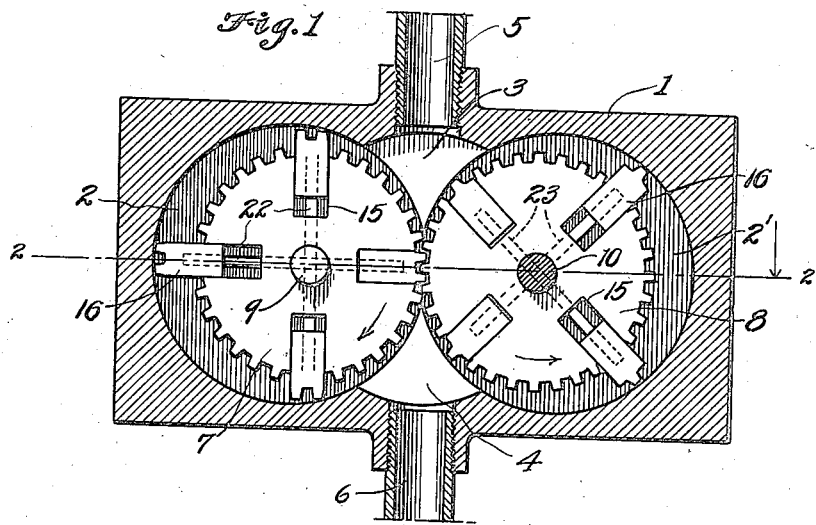
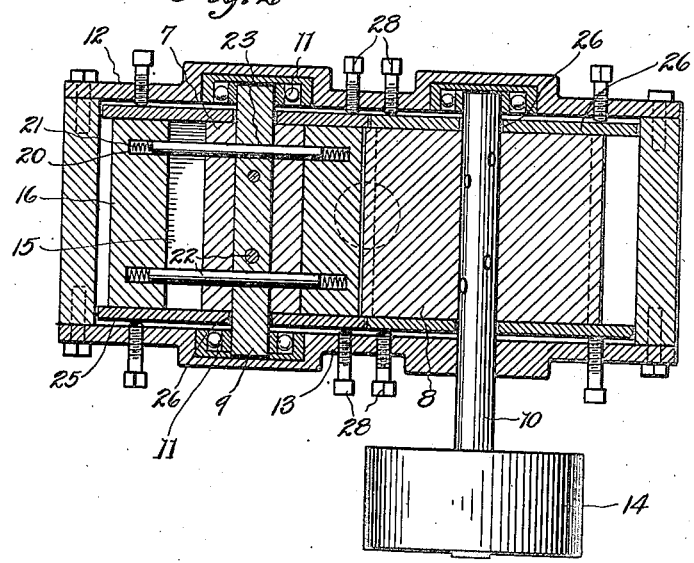
Inventor
JOHN G. JOHNSON
By Attorney
Richard J. Cook Patented Nov. 21, 1922.

1,436,263

UNITED STATES PATENT OFFICE.

JOHN G. JOHNSON, OF TACOMA, WASHINGTON, ASSIGNOR OF ONE-HALF TO JOHN R. KIELY, OF TACOMA, WASHINGTON.

COMPRESSOR.

Application filed November 23, 1920. Serial No. 425,942.

*To all whom it may concern:*

Be it known that I, JOHN G. JOHNSON, a subject of the King of England, and resident of the city of Tacoma, county of Pierce, State of Washington, have invented certain new and useful Improvements in Compressors, of which the following is a specification.

My invention relates to improvements in compressors, pumps, and the like; more particularly, it relates to compressors of that character especially useful in connection with certain cooling systems for compressing and circulating ammonia gas through the expansion coils.

The principal object of the invention is to provide a compressor of the above character that is simple in construction, efficient in operation and wherein the usual valve mechanism is eliminated.

It is also an object of the invention to provide a compressor wherein a pair of geared rotors operate in mesh eccentrically within cylindrical chambers, and wherein each rotor is equipped with a plurality of radially moving impellers which operate cooperatively in such manner as to cause the fluid to be compressed to be drawn by a created vacuum pressure into the chambers at one side and to be discharged therefrom at the opposite side.

Another object of the invention is to provide improvements in the construction of packing plates, to be used to prevent leakage about the rotors and to provide means for adjusting the packing plates as is necessary to take up wear thereon.

In accomplishing these and other objects of the invention, I have provided the improved details of construction, the preferred forms of which are illustrated in the accompanying drawings, wherein—

Figure 1 is a vertical section through the housing of a compressor constructed according to the present invention; for the purpose of better illustration, the rotors and impellers are not sectional.

Figure 2 is a horizontal section taken on the line 2—2 in Figure 1.

Referring more in detail to the drawings—

1 designates the compressor housing, or casing, wherein there are two cylindrical, parallel chambers 2 and 2'. These chambers open into each other centrally of the casing, and are provided at their upper and lower sides with inter-communicating channels 3 and 4, into which inlet and outlet conduits 5 and 6 respectively are extended.

Rotatably and eccentrically mounted within the chambers 2 and 2' are peripherally geared rotors 7 and 8 which are supported respectively by shafts 9 and 10 so as to operate in mesh through the communication opening between the chambers. The shaft 9 is supported at its ends within antifriction bearings 11 mounted in sockets provided in face plates 12 and 13 which close the opposite ends of the casing 1, while the shaft 10 extends at one end from the casing and is equipped with a belt pulley wheel 14 whereby the device may be operated.

The rotors 7 and 8 are supported axially in the plane of the axial lines of the cylinders 2 and 2', and are of a lesser diameter than the chambers. In the present construction, each rotor is equipped with four equally spaced, and radially directed slots 15 wherein impellers or blades 16 are slidably mounted and which, at their outer edges, are geared as required in order that they will move operatively into mesh with the rotor surfaces as they are revolved therewith. The impellers, when the device is operating, would be moved by centrifugal force outwardly to engage the chamber wall but in order that they may be held effectively in rubbing contact therewith, I have provided sockets 20 in the base of each and have placed coiled springs 21 therein, the latter being engaged by the ends of pins 22 that extend slidably through bores 23 placed centrally through the rotors between oppositely disposed blades and in registration with the impeller sockets.

In order to prevent as much as possible any leakage about the rotors, I have provided, on the opposite ends of each chamber, packing or wearing plates 25. These are made circular to snugly fit within the chambers between the rotor ends and end plates 1, 2 and 13 and are provided with apertures 26 for receiving the rotor shafts. These plates are adjustably tightened against the rotor ends by means of set screws, or bolts 28 that are threaded through the end plates to engage the plates 25 at different points about their periphery, and which may be adjusted as is necessary to take up looseness incidental to wear, so that a tight fit may be maintained at all times.

In operation, the rotors are revolved by means of the shaft 10 and as they revolve, the impellers move radially into and from rotors. With the rotors operating in the direction indicated by the arrows thereon in Figure 1, fluid will be drawn into the casing through the conduit 6 by the vacuum pressure created, will fill the expanding pockets between the impeller blades and will be carried upwardly and finally discharged, as the size of the pockets diminish, through the channel 3 and conduit 5.

Having thus described my invention, what I claim as new therein and desire to secure by Letters-Patent, is:

1. A compressor of the class described comprising a casing containing two parallel cylindrical chambers overlapping each other and forming an opening between the same and having inter-communication channels at opposite sides of said opening, respectively provided with fluid inlet and exhaust conduits, peripherally geared rotors, of smaller diameter than their respective chambers mounted eccentrically therein and meshing with each other through said opening, a plurality of radially movable impellers mounted in each of said rotors, normally extended to engage the cylinder walls and geared at their outer edges to mesh with the geared surfaces of the rotors as the latter are revolved.

2. A compressor of the class described comprising a casing containing two parallel cylindrical chambers overlapping each other and forming an opening between the same and having inter-communication channels at opposite sides of said opening, respectively provided with fluid inlet and exhaust conduits, peripherally geared rotors, of smaller diameter than their respective chambers mounted eccentrically therein to revolve in said chambers and meshing with each other through said opening, a plurality of radially movable impellers mounted in each of said rotors, having gear teeth at their outer edges movable into mesh with the geared surfaces of the rotors, yieldable means for normally retaining said impellers extended to engage the cylinder walls and a drive shaft extending from the casing from one of said rotors.

3. In a compressor of the class described comprising a casing containing two parallel cylindrical chambers overlapping each other and forming an opening between the same and having inter-communication channels at opposite sides of said opening, respectively provided with fluid inlet and exhaust conduits, peripherally geared rotors, of smaller diameter than their respective chambers mounted eccentrically therein and revoluble in mesh with each other through said opening, said rotors having a plurality of radially and axially directed slots therein and having transverse bores between the opposite slots, impellers mounted to move radially in said slots, having sockets in the inner edges registering with said bores, coiled springs seated on said sockets, and pins extended through said bores and at their ends engaging said springs to yieldingly retain the impellers extended to engage the cylinder walls, for the purpose set forth.

Signed at Seattle, Washington, this 16th day of November, 1920.

JOHN G. JOHNSON.